Dec. 12, 1950 B. A. BELS 2,533,912
RESONANT ELECTRICAL ARRANGEMENT
Filed Dec. 4, 1946
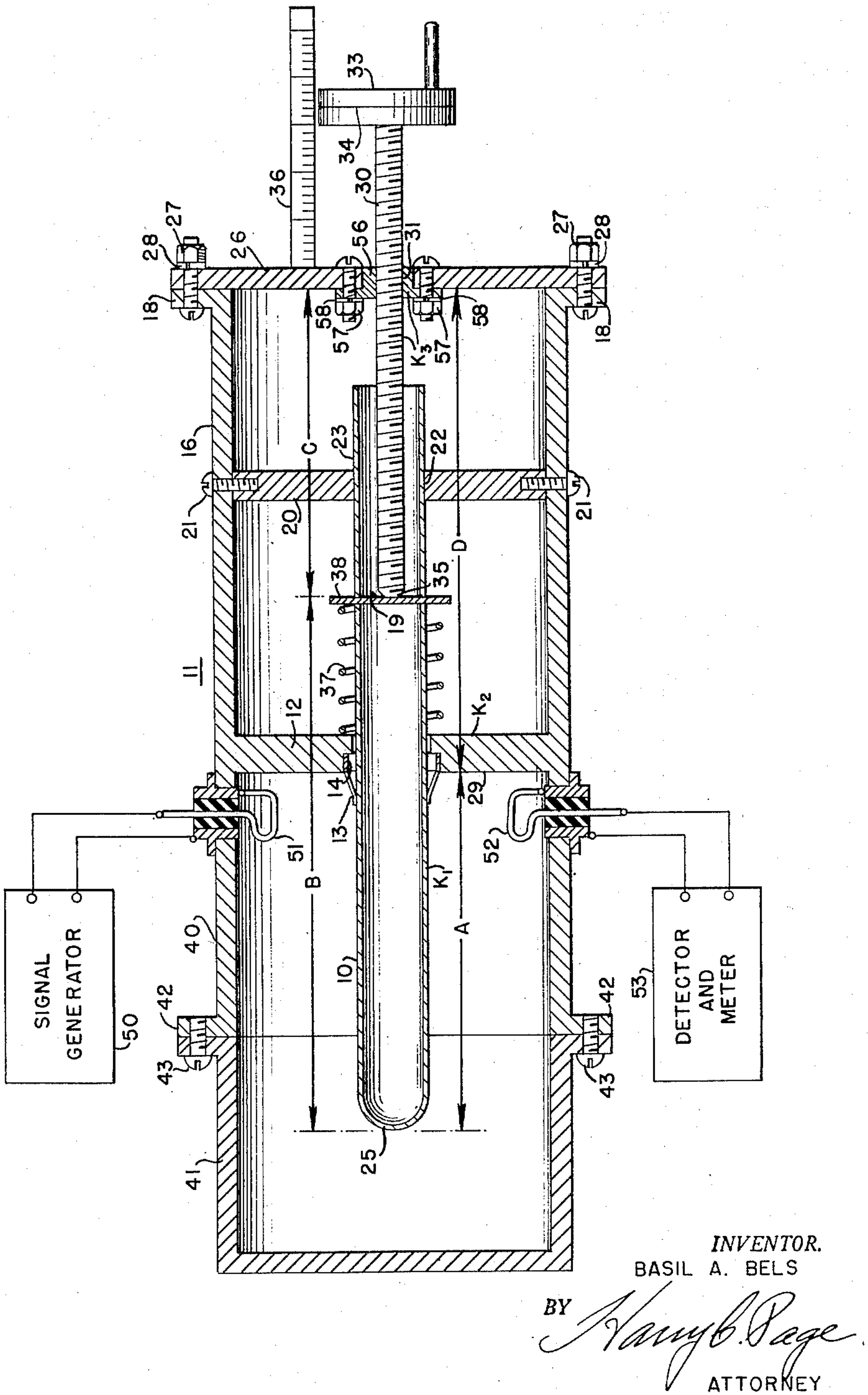
INVENTOR.
BASIL A. BELS
BY Harry C. Page
ATTORNEY Patented Dec. 12, 1950 2,533,912

UNITED STATES PATENT OFFICE 2,533,912

RESONANT ELECTRICAL ARRANGEMENT

Basil A. Bels, Great Neck, N. Y., assignor to Hazeltine Research, Inc., Chicago, Ill., a corporation of Illinois Application December 4, 1946, Serial No. 714,081

4 Claims. (Cl. 178—44)

This invention relates to resonant electrical arrangements and, particularly, to high-frequency electrical arrangements having a resonant frequency which remains substantially constant over a relatively wide range of operating temperatures. In greater particularity, the present invention pertains to adjustable high-frequency electrical arrangements which are tunable to any selected frequency within a range of operating frequencies and which are temperature-compensated so that the selected frequency remains substantially constant despite wide variations in the operating temperatures of the arrangement. Such arrangements are especially useful as high-frequency wave meters. Accordingly, the invention will be described in that connection.

In making electrical measurements it is frequently desirable to employ a high-frequency wave meter which has frequency stability over a relatively wide range of operating temperatures. The resonant frequency of many of these devices is established by the relative position of an adjustable frequency-determining element or plunger with respect to the position of a fixed electrical element. Temperature variations alter the relative position of these two elements and hence modify the resonant frequency of the arrangement. Heretofore, various constructions have been proposed to overcome this difficulty but have not proved entirely satisfactory. In general, elements having extremely low thermal coefficients of expansion, particularly nickel-iron alloys sold under the trade name Invar by the Carpenter Steel Company of Reading, Pennsylvania, have been employed in various combinations to maintain, in each position of adjustment of the frequency-determining element, the desired relation between the last-mentioned element and the fixed element with variation in operating temperature. These prior arrangements have not afforded the precise temperature stability required for precise measuring purposes, or have been too expensive. When Invar is employed substantially throughout such an arrangement, the cost is approximately ten times higher than when more inexpensive metals are employed. Furthermore, it is undesirable to employ Invar in constructions which must carry high-frequency electrical currents since the conductivity of Invar is not as high as is ordinarily desired. While the conductivity for high-frequency currents may be greatly improved by plating with a material such as silver which has excellent conductive properties, and then with rhodium or palladium where wear-resisting properties are required, the wide difference between the thermal coefficients of linear expansion of the Invar and the plating material causes the plating to peel from the Invar when the temperature variations are considerable, thus impairing the operation of the electrical device.

It is an object of the invention, therefore, to provide a new and improved temperature-compensated electrical arrangement which avoids one or more of the above-mentioned disadvantages and limitations of prior arrangements.

It is another object of the invention to provide a new and improved adjustable resonant electrical arrangement which is constructed principally of relatively inexpensive metals and which affords temperature compensation over a relatively wide range of operating temperatures.

It is a further object of the invention to provide a new and improved coaxial cavity resonator which may be resonated over a relatively large band of frequencies and which affords accurate temperature compensations so that any selected operating frequency within the above-mentioned band of frequencies remains substantially constant over the range of operating temperatures of the arrangement.

It is an additional object of the invention to provide a high-frequency wave meter which is adjustable over a band of frequencies and which is temperature-compensated for any frequency within that band of frequencies.

In accordance with the present invention, a resonant electrical arrangement comprises an elongated resonance-determining element which has a predetermined length and is constructed of a material having a first thermal coefficient of linear expansion. The arrangement also includes supporting means therefor constructed of a second material having a second thermal coefficient of linear expansion and having one portion resiliently engaging the resonance-determining element at any of a plurality of positions along the aforesaid predetermined length and another portion spaced a predetermined distance from the aforesaid one portion. The arrangement further includes means co-operating with the supporting means at the other portion thereof and engaging the resonance-determining element adjacent one end thereof for adjusting the position of the other end thereof with respect to the one portion of the supporting means. The adjusting means is constructed of a material having an approximately minimum thermal coefficient of linear expansion which is much less than the first and the second thermal coefficients. The portion of the resonance-determining element between the other end thereof and the one portion of the supporting means is effective to determine the resonant frequency of the arrangement. The aforesaid predetermined length of the resonance-determining element and the predetermined distance between the aforesaid one and the aforesaid other portions of the supporting means are so selected that the product of the predetermined length and the first thermal coefficient is substantially equal to the product of the predetermined distance and the second thermal coefficient so that the resonant frequency of the arrangement remains substantially constant over a range of operating temperatures.

For a better understanding of the present invention, together with other and further objects thereof, reference is had to the following description taken in connection with the accompanying drawing, and its scope will be pointed out in the appended claims.

Referring now to the drawing, there is illustrated an axial sectional view of a resonant electrical arrangement, specifically a high-frequency wave meter, in accordance with the present invention. As represented in the drawing, the wave meter comprises an elongated resonance-determining element or plunger 10 having a predetermined length designated B and constructed of a material having a first thermal coefficient of linear expansion. Any of the more inexpensive electrically conductive materials such as steel or brass which have thermal coefficients of linear expansion, designated by the symbol $K_1$ in the drawing, within the approximate range of $10\times10^{-6}$ to $20\times20^{-6}$ inches per inch length per degree centigrade variation in temperature may be employed in the plunger 10. The outer surface of the plunger preferably has a thin plating of silver and a similar plating of rhodium to enhance the high-frequency conductivity and wear-resisting capabilities. The plunger has a supporting means therefor which comprises a cylindrical member 11 having one portion in the form of a disc 12 with a plurality of conductive spring fingers 13 mounted in an axial bore 14 for resiliently engaging the periphery of the plunger 10 at any of a plurality of positions along the length of the plunger. The cylindrical member 11 includes another portion in the form of a cylindrical skirt 16, the flanged end 18 of which effectively engages one end 19 of the plunger 10 in a manner to be made clear hereinafter. The cylindrical member 11 has a predetermined effective length designated D and is constructed of a material having a second thermal coefficient of linear expansion, designated by the symbol $K_2$ in the drawing, which may be equal to or different from the first-mentioned coefficient. Accordingly, steel or brass or other relatively inexpensive materials may be employed in the skirt. An annular disc 20 is attached to the inner periphery of the skirt 16 with suitable fasteners 21, 21 and is provided with an axial bore 22 which serves as a guideway for an extension 23 on the end 19 of the plunger 10 during axial movement thereof.

The arrangement in accordance with the invention also includes means co-operating with the cylindrical member 11 at the aforesaid other position thereof, this position comprising the flanged end 18 of the skirt 16, and engaging the plunger 10 adjacent its end 19 for adjusting the position of the end 25 with respect to one portion of the cylindrical member 11, specifically the surface 29 on disc 12. This adjusting means comprises a plate 26, which is attached to the flanged end 18 by means of fasteners 27, 27 provided with lock washers 28, 28, and a threaded rod 30 which is adjustable in a complementary bore 31 in a disc 56 which is secured to the plate 26 by fasteners 57, 57 including lock washers 58, 58. One end of the threaded rod includes a crank arrangement 33 having a suitable reference line 34 scribed thereon. The latter co-operates with a suitable scale 36 for indicating the position of the rod 30 relative to the plate 26. The other end 35 of the rod is conditioned to engage the end 19 of the plunger 10. The active length of the rod 30 at any given position of adjustment is represented by the dimension C. An antibacklash means in the form of a coil spring 37 is positioned between the disc 12 of the member 11 and a flange 38 on the plunger 10. This spring serves the dual purpose of maintaining the end 19 of the plunger in co-operative engagement with the end 35 of the threaded rod 30 while biasing the plunger and the rod toward the disc 56 so as to eliminate all backlash during an adjusting operation.

The disc 56 and the threaded rod 30 are constructed of a material having an extremely low thermal coefficient of linear expansion, designated by the symbol $K_3$ in the drawing, which is preferably much less than either of the previously mentioned coefficients. A nickel-iron alloy, sold under the trade name Invar and having a 36 per cent. nickel content and a thermal coefficient of $0.9\times10^{-6}$ inches per inch length per degree centrigrade or less, is particularly desirable since its thermal coefficient is substantially a minimum in relation to known useful materials. In fact some specimens of this alloy may be obtained which exhibit zero temperature coefficients of linear expansion.

The cylindrical member 11 also includes a third portion which extends in parallel relation to and, more particularly, is concentric with the plunger 10. This portion comprises a cylindrical outer conductor 40 having a cup-shaped extension 41 attached to its flange end 42 by means of conventional fasteners 43, 43. The surface 29 and the inner surfaces of the members 40 and 41 are preferably plated with a material such as silver to facilitate the conduction of high-frequency currents. The plunger 10 forms the inner conductor while the extension 41 and the conductor 40 form the outer conductor of a high-frequency coaxial resonator. The combined length of the outer conductor 40 and the extension 41 preferably is appreciably greater than one-quarter wave length of the longest resonant wave length of the arrangement. The portion of the plunger 10 between its end 25 and the surface 29 of the disc 20 is effective, in a well-known manner, to determine the resonant frequency of the wave-meter structure.

Temperature compensation is incorporated into the wave-meter structure by selecting the length B of the plunger 10 and the effective length D of the cylindrical member or support 11 so that the product of the length B and the first thermal coefficient $K_1$ is substantially equal to the product of the effective length D and the second thermal coefficient $K_2$ in order that the resonant frequency of the wave meter will remain substantially constant over a range of operating temperatures. The reason for this proportioning will be explained in detail subsequently.

Wave-signal energy is applied to the wave meter from a signal generator 50, the frequency of which is to be measured, by means of an input coupling loop 51 which is connected to the generator. Output signals are derived by an output coupling loop 52, which is mounted in the outer conductor 40 diametrically opposite the coupling loop 51 in a position where the magnetic field is an approximate maximum, and are applied to a detector and meter unit 53 of conventional construction.

Considering briefly the operation of the above-described wave meter for determining the frequency of the output signal of the signal generator 50, the threaded rod 30 is rotated by means of the crank arrangement 33 to adjust the plunger 10 axially until a maximum indication is observed on the scale of the detector and meter unit 53. The position of the reference line 34 with respect to the scale 36 is then noted so that the resonant frequency may be determined in a well-known manner.

It will be apparent that the temperature of the wave meter may increase due to continuous operation and for other reasons such as a change in ambient temperature. Accordingly, the length of certain portions of the wave meter will increase. By maintaining the length A of the projecting portion of the plunger 10 substantially constant, however, the resonant frequency of the wave meter will be unaffected by temperature variations at any given position of adjustment. This may be demonstrated mathematically by the following equations which include the previously identified dimensions of the wave meter.

$$A=B+C-D \quad (1)$$

$$A_t-A=\Delta A=B_t+C_t-D_t-(B+C-D) \quad (2)$$

where the suffix $t$ is affixed to a dimension indicates the corresponding new dimension at an elevated temperature $t$, and the prefix $\Delta$ denotes the change in a parameter such as length or time.

$$\Delta A=B+K_1B\Delta t+C+K_3C\Delta t-D-K_2D\Delta t-B-C+D \quad (3)$$

$$=K_1B\Delta t+K_3C\Delta t-K_2D\Delta t \quad (4)$$

also $$\Delta A=0 \quad (5)$$

to achieve frequency stability. Since the threaded rod 30 and the plate 26 are made of Invar, the dimension C will vary a minimum amount and, for the purposes of this analysis, may be considered constant in length. Hence $$K_3=0 \quad (6)$$

$$K_3C=0 \quad (7)$$

Substituting in Equation 4 and simplifying $$K_1B=K_2D \quad (8)$$

Thus, when an adjustable Invar rod 30 is employed and the other elements of the wave meter are proportioned so that the product of the effective length B of the plunger 10 and the thermal coefficient $K_1$ of the latter are substantially equal to the product of the effective length D of the cylindrical supporting member 11 and its thermal coefficient $K_2$, the resonant frequency of the wave meter remains substantially constant over a range of operating temperatures. Similarly, when the temperature of the wave meter decreases, the relation expressed by Equation 8 is also valid.

Since the flanged end 18 of the cylindrical supporting member 11 is connected to the end 19 of the plunger 10 through the plate 26, the Invar disc 55, and the Invar rod 30, and the latter for practical considerations has a constant effective length for any one position of adjustment, the cylindrical member 11 may be considered effectively to engage one end of the plunger 10. It will also be manifest that a fixed frequency-tuning arrangement will be provided if an Invar 30 were dispensed with and a properly proportioned cylindrical member 11 were placed in direct engagement with the end 19 of the plunger 10. Thus materials having widely different thermal coefficients of linear expansion may be employed in the construction of the device since compensation therefor is introduced in the design of the device.

While the invention has been described in connection with a high-frequency wave meter, it will be apparent that the invention is equally applicable to other electrical devices such as oscillators and antennas for those applications wherein a substantially constant operating frequency is desired over a relatively wide range of operating temperatures.

It will be manifest from the foregoing description of the invention, that a resonant electrical arrangement embodying the present invention requires a comparatively small amount of the more expensive materials such as Invar in the construction thereof although it affords accurate temperature compensation.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A resonant electrical arrangement comprising, an elongated resonance-determining element having a predetermined length and constructed of a material having a first thermal coefficient of linear expansion, supporting means therefor constructed of a second material having a second thermal coefficient of linear expansion and having one portion resiliently engaging said resonance-determining element at any of a plurality of positions along said predetermined length and another portion spaced a predetermined distance from said one portion, and means co-operating with said supporting means at said other portion thereof and engaging said resonance-determining element adjacent one end thereof for adjusting the position of the other end thereof with respect to said one portion of said supporting means, said adjusting means being constructed of a material having an approximately minimum thermal coefficient of linear expansion which is much less than said first and said second thermal coefficients, the portion of said resonance-determining element between said other end thereof and said one portion of said supporting means being effective to determine the resonant frequency of said arrangement, said predetermined length of said resonance-determining element and said predetermined distance between said one and said other portions of said supporting means being so selected that the product of said predetermined length and said first thermal coefficient is substantially equal to the product of said predetermined distance and said second thermal coefficient so that the resonant frequency of said arrangement remains substantially constant over a range of operating temperatures.

2. A resonant electrical arrangement comprising, an elongated resonance-determining element having a predetermined length and constructed of a material having a first thermal coefficient of linear expansion, supporting means therefor constructed of a second material having a second thermal coefficient of linear expansion and having one portion resiliently engaging said resonance-determining element at any of a plurality of positions along said predetermined length and another portion spaced a predetermined distance from said one portion, and means co-operating with said supporting means at said other portion thereof and engaging said resonance-determining element adjacent one end thereof for adjusting the position of the other end thereof with respect to said one portion of said supporting means, said adjusting means being constructed of a material having a thermal coefficient of linear expansion which is approximately one-tenth to one-twentieth of said first and said second thermal coefficients, the portion of said resonance-determining element between said other end thereof and said one portion of said supporting means being effective to determine the resonant frequency of said arrangement, said predetermined length of said resonance-determining element and said predetermined distance between said one and said other portions of said supporting means being so selected that the product of said predetermined length and said first thermal coefficient is substantially equal to the product of said predetermined distance and said second thermal coefficient so that the resonant frequency of said arrangement remains substantially constant over a range of operating temperatures.

3. A resonant electrical arrangement comprising, an elongated resonance-determining element having a predetermined length and constructed of a material having a first thermal coefficient of linear expansion within the approximate range of $10\times10^{-6}$ to $20\times10^{-6}$ inches per inch length per degree centigrade change in temperature, supporting means therefor constructed of a second material having a second thermal coefficient of linear expansion of the order of magnitude of $10\times10^{-6}$ to $20\times10^{-6}$ inches per inch length per degree centigrade change in temperature and having one portion resiliently engaging said resonance-determining element at any of a plurality of positions along said predetermined length and another portion spaced a predetermined distance from said one portion, and means co-operating with said supporting means at said other portion thereof and engaging said resonance-determining element adjacent one end thereof for adjusting the position of the other end thereof with respect to said one portion of said supporting means, said adjusting means being constructed of a material having a thermal coefficient of linear expansion of approximately $0.9\times10^{-6}$ inches per inch length per degree centigrade change in temperature, the portion of said resonance-determining element between said other end thereof and said one portion of said supporting means being effective to determine the resonant frequency of said arrangement, said predetermined length of said resonance-determining element and said predetermined distance between said one and said second portions of said supporting means being so selected that the product of said predetermined length and said first thermal coefficient is substantially equal to the product of said predetermined distance and said second thermal coefficient so that the resonant frequency of said arrangement remains substantially constant over a range of operating temperatures.

4. A resonant electrical arrangement comprising, an elongated resonance-determining plunger having a predetermined length and constructed of a material having a first thermal coefficient of linear expansion, supporting means therefor constructed of a second material having a second thermal coefficient of linear expansion and having one portion resiliently engaging said resonance-determining plunger at any of a plurality of positions along said predetermined length and another portion spaced a predetermined distance from said one portion, a member attached to said supporting means at said other portion, and a threaded rod adjustably mounted in said member and engaging said resonance-determining plunger adjacent one end thereof for adjusting the position of the other end thereof with respect to said one portion of said supporting means, said member and threaded rod being constructed of a material having an approximately minimum thermal coefficient of linear expansion which is much less than said first and said second thermal coefficients, the portion of said resonance-determining plunger between said other end thereof and said one portion of said supporting means being effective to determine the resonant frequency of said arrangement, said predetermined length of said resonance-determining plunger and said predetermined distance between said one and said other portions of said supporting means being so selected that the product of said predetermined length and said first thermal coefficient is substantially equal to the product of said predetermined distance and said second thermal coefficient so that the resonant frequency of said arrangement remains substantially constant over a range of operating temperatures.

BASIL A. BELS.

REFERENCES CITED

The following references are of record in the file of this patent:

UNITED STATES PATENTS

| Number | Name | Date |
|---|---|---|
| 1,617,995 | Ellis | July 14, 1925 |
| 2,077,800 | Kroger | Apr. 20, 1937 |
| 2,086,615 | Grundmann | July 13, 1937 |
| 2,103,457 | Hansell | Dec. 28, 1937 |
| 2,103,515 | Conklin | Dec. 28, 1937 |
| 2,109,880 | Dow | Mar. 1, 1938 |
| 2,124,029 | Conklin | July 19, 1938 |
| 2,181,871 | Conklin | Dec. 5, 1939 |
| 2,215,582 | Goldstine | Sept. 24, 1940 |
| 2,235,521 | Higgins | Mar. 18, 1941 |
| 2,251,085 | Unk | July 29, 1941 |

Certificate of Correction

Patent No. 2,533,912 December 12, 1950

BASIL A. BELS

It is hereby certified that error appears in the printed specification of the above numbered patent requiring correction as follows:

Column 2, line 22, for the word "compensations" read *compensation*; column 3, line 36, for "$20\times 20^{-6}$" read $20\times 10^{-6}$; column 5, line 40, strike out "is";

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*